(12) United States Patent
Nilsson et al.

(10) Patent No.: US 6,248,038 B1
(45) Date of Patent: Jun. 19, 2001

(54) DIRECTION REVERSING TRANSMISSION GEAR FOR VEHICLE

(75) Inventors: Dag Nilsson; Lars-Olov Strandås, both of Södertälje (SE)

(73) Assignee: Scania CV AB (SE)

( * ) Notice: Subject to any disclaimer, the term of this patent is extended or adjusted under 35 U.S.C. 154(b) by 0 days.

(21) Appl. No.: 09/009,519

(22) Filed: Jun. 23, 1998

(51) Int. Cl.[7] .................................................. F16H 3/54
(52) U.S. Cl. ........................ 475/286; 475/299; 475/303
(58) Field of Search ................................... 475/286, 299, 475/303, 317, 323

(56) References Cited

U.S. PATENT DOCUMENTS

| | | | |
|---|---|---|---|
| 1,463,638 | * | 7/1923 | Thallmayer .......................... 475/286 |
| 4,016,825 | * | 4/1977 | Pichl ................................... 475/286 |
| 5,083,993 | * | 1/1992 | Öun ..................................... 475/299 |

FOREIGN PATENT DOCUMENTS

11623 * 6/1903 (GB) ................................... 475/286

* cited by examiner

*Primary Examiner*—Sherry L. Estremsky
(74) *Attorney, Agent, or Firm*—Ostrolenk, Faber, Gerb & Soffen, LLP

(57) ABSTRACT

A transmission gear comprising a fixed gear case, a drive shaft and a driven shaft supported for independent rotation in the gear case and a planetary gear arranged between the drive and driven shafts. The planetary gear comprises a sun wheel that is nonrotatably connected with the drive shaft, a planetary wheel carrier around the sun wheel which is rotated with respect to the sun wheel, at least one planet wheel supported on the planet wheel carrier around the sun wheel and each planet wheel mates with the sun wheel to be rotated thereby. A gear rim rotates with respect to and mates with the planet wheels. An axially displaceable clutch element has a first axial position at which the clutch element couples the planet wheel carrier with the gear case in a torsionally rigid manner and has a second axial position at which the clutch element couples the planet wheel carrier with a driven shaft in a torsionally rigid manner. The clutch element comprises separated but joined together clutch wheels. The gear rim encompasses the planet wheels and is also axially moveable between third and fourth positions. The gear rim mates with the planet wheel. In the third position, the gear rim is torsionally rigidly connected with the gear case. In the fourth position, the gear rim is torsionally rigidly connected with the driven shaft.

17 Claims, 1 Drawing Sheet

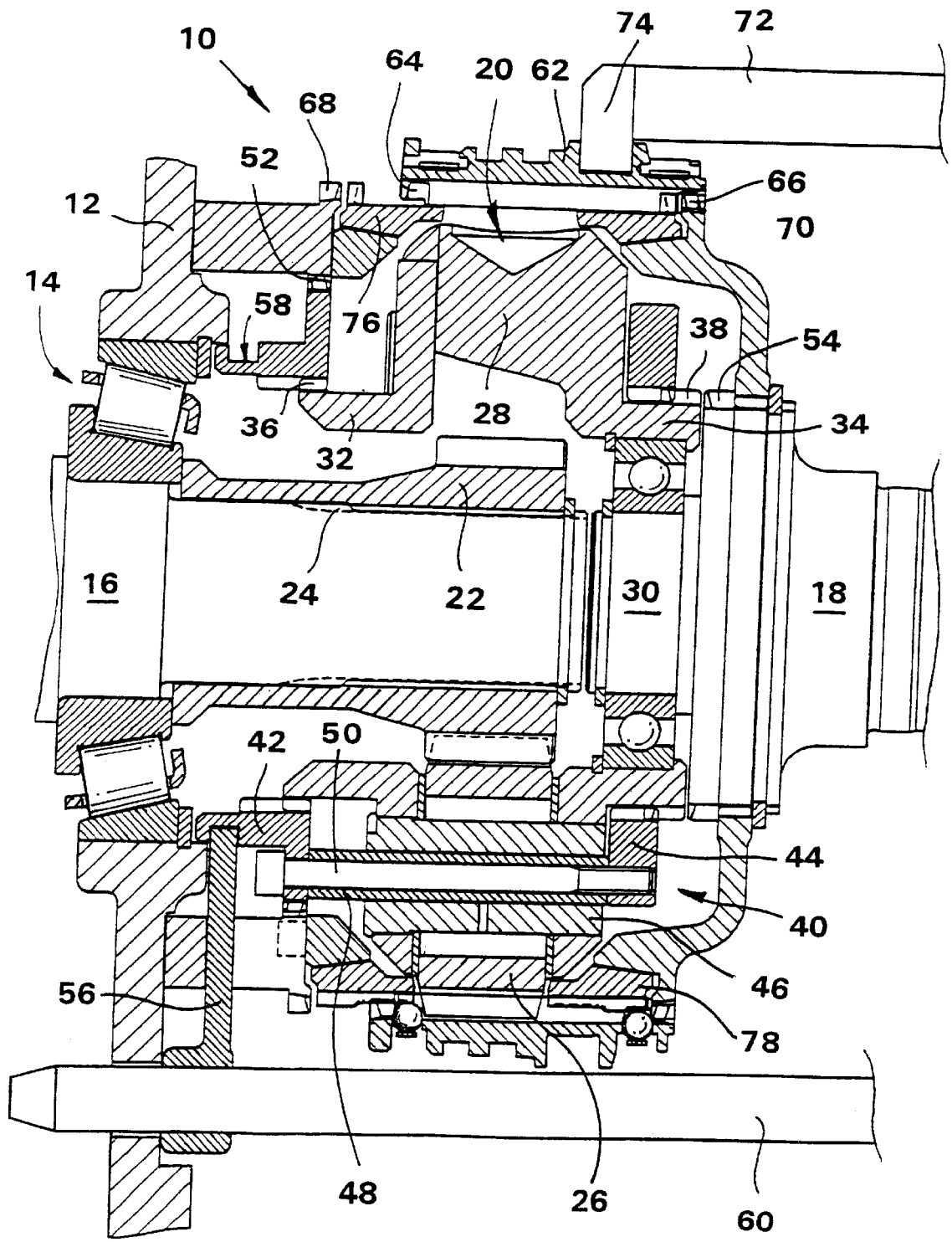

DIRECTION REVERSING TRANSMISSION GEAR FOR VEHICLE

BACKGROUND OF THE INVENTION

The invention relates to a transmission gear, particularly one built into heavy-duty vehicles as an auxiliary gear between a main gear and the driveline leading to the drive wheels in order to double the number of gears available in the main gear. All gear steps of the main gear can thus be further transmitted to the driveline either with a lower transmission or with a higher transmission. Transmission gears of this kind usually comprise a planetary gear whose ratio of transmission will come into effect when the transmission gear is to transmit the gear steps of the main gear with a lower transmission to the driveline.

Although known transmission gears can change the overall transmission of the driveline, the drive shaft and the driven shaft of known transmission gears will always rotate in the same direction.

SUMMARY OF THE INVENTION

The invention therefore has the object of providing a transmission gear which in a simple manner allows its driven shaft to also rotate opposite the direction of rotation of its drive shaft.

This object is achieved according to the present invention by a transmission gear comprising a fixed gear case, a drive shaft and a driven shaft supported for independent rotation in the gear case and a planetary gear arranged between the drive and driven shafts. The planetary gear comprises a sun wheel that is nonrotatably connected with the drive shaft, a planetary wheel carrier around the sun wheel which is rotated with respect to the sun wheel, at least one planet wheel supported on the planet wheel carrier around the sun wheel and each planet wheel mates with the sun wheel to be rotated thereby. A gear rim rotates with respect to and mates with the planet wheels. An axially displaceable clutch element has a first axial position at which the clutch element couples the planet wheel carrier with the gear case in a torsionally rigid manner and has a second axial position at which the clutch element couples the planet wheel carrier with a driven shaft in a torsionally rigid manner. The clutch element comprises separated but joined together clutch wheels. The gear rim encompasses the planet wheels and is also axially moveable between third and fourth positions. The gear rim mates with the planet wheel. In the third position, the gear rim is torsionally rigidly connected with the gear case. In the fourth position, the gear rim is torsionally rigidly connected with the driven shaft.

Whereas the planet wheel carrier of the planetary gear contained in the transmission gear is conventionally fixedly connected with the driven shaft, it is possible according to the present invention to detach the connection between the planet wheel carrier and the driven shaft in order to couple the planet wheel carrier in a torsionally rigid manner with a fixed gear case of the transmission gear. In the transmission gear according to the present invention it is therefore possible to couple the planet wheel carrier with the driven shaft on the one hand or with the gear case or also any other fixed component on the other hand. In the transmission gear according to the present invention, if the planet wheel carrier is torsionally rigidly connected with the gear case (or any other fixed component), the driven shaft of the transmission gear rotates in the opposite direction of its drive shaft. The main gear connected upstream therefore no longer needs to be provided with a reverse gear, because the transmission gear according to the present invention enables every gear of the main gear to also be used as a reverse gear. This allows saving of three toothed wheels and one shaft in the main gear. The overall length of the main gear can thus be kept shorter, which benefits the stability of the main gear, and in particular its resistance against introduced high forces and torques. Moreover, the main gear is lighter and is cheaper to produce owing to omission of the reverse gear. Although the layout of a transmission gear according to the present invention is slightly more complicated and also slightly heavier in comparison with conventional transmission gears, the combination of a transmission gear according to the present invention and a main gear without a separate reverse gear is still considerably lighter and also cheaper than the combination of a conventional transmission gear with a conventional main gear.

The clutch element is axially displaceable between two positions. According to the present invention, the clutch element allows coupling the planet wheel carrier either with the gear case or with the driven shafts. In the preferred embodiment of the transmission gear, the clutch element comprises two axially spaced, annular clutch wheels which are mutually connected in a torsionally rigid way. Each clutch wheel concentrically encompasses an axial extension of the planet wheel carrier with a reduced diameter. The two axial extensions of the planet wheel carrier extend from mutually opposite faces thereof. Such an arrangement leads to a particularly compact design of the transmission gear according to the present invention.

According to a modified embodiment a first one of the two annular clutch wheels is internally and externally toothed and couples the planet wheel carrier torsionally rigidly with the gear case in the first position of the clutch element by a respective mating of teeth. The planet wheel carrier is provided with a toothing which mates with the inner toothing of the first clutch wheel, whereas the casing (or any other fixed component) is provided with a toothing which mates with the outside toothing of the first clutch wheel. The second of the two annular clutch wheels is internally toothed in this embodiment and couples the planet wheel carrier in a torsionally rigid way with the driven shaft in the second position of the clutch wheel by a respective mating of teeth. For this purpose, the associated axial extension of the planet wheel carrier is provided with a toothing which can mate with the inner toothing of the second clutch wheel, and the driven shaft is also provided with such a toothing.

The torsionally and axially rigid connection of the two clutch wheels of the clutch element is preferably achieved according to the present invention by one or several components which extend(s) through at least one of the planet wheels, in particular through its shaft. Such an arrangement benefits the compact design of the transmission gear according to the present invention.

The displacement of the clutch element between its two positions, i.e. the changeover between rotation of the drive and driven shaft in the same and opposite directions, is advantageously achieved by an axially movable actuating member which projects radially into the gear case and engages one of the clutch wheels with its radially inner end. As a result of the torsionally and axially rigid connection between the two clutch wheels, the other clutch wheel is also axially displaced when the first clutch wheel is axially displaced by the actuating member.

According to a preferred embodiment, the radially outer end of the actuating member is rigidly connected with an actuating rod which extends in the axial direction radially outside of the gear rim of the transmission gear. This actuating rod can be coupled with a switch or servo cylinder to be controlled by the driver, so that it is easy to change over between forward and reverse run of the transmission gear.

For the purpose of changing over between its lower and its higher transmission, the transmission gear according to the present invention is preferably provided with a first toothing which is torsionally rigidly connected with the gear case and a second toothing which is axially spaced from the first one and is torsionally rigidly connected with the driven shaft. An axially displaceable gear rim is arranged between the two toothings. The gear rim is provided in this embodiment with mating teeth at its axial ends in continuation of its inner teeth. By means of these teeth, and depending on its axial position, the gear rim can mate either with the first toothing arranged on the gear case or with the second toothing which is torsionally rigidly connected with the driven shaft.

Synchronizing rings are preferably arranged in the embodiment described above between the gear rim and the first toothing as well as between the gear rim and the second toothing. They allow an ordered gearing of the mating teeth of the gear rim with the first or second toothing. The gear rim is also preferably axially displaced by means of an actuating rod on which an actuating member is fastened which projects radially inwardly and is in engagement with the gear rim. This actuating rod can also be coupled with a servo cylinder.

In a special embodiment of the transmission gear according to the present invention a mechanical lock prevents the displaceable clutch element being located in its first position while the gear rim is simultaneously in engagement by means of its mating teeth with the first toothing which is connected with the gear case in a torsionally rigid manner. This prevents activation of the reverse run occurring concurrently with the lower transmission of the transmission gear, as this combination would lead to a blockage of the transmission gear and would therefore destroy the transmission gear during driving of a vehicle including the transmission gear according to the present invention. The mechanical lock can be arranged in such a way that it exercises its locking function only during driving. Once the vehicle stands still, the lock is deactivated and the reverse gear can be put in together with the lower transmission in order to prevent the vehicle from rolling away.

Other features and advantages of the present invention will become apparent from the following description of the invention which refers to the accompanying drawings.

BRIEF DESCRIPTION OF THE DRAWING

A preferred embodiment of the transmission gear according to the present invention will be explained below by reference to the only FIGURE showing a cross-section through the transmission gear.

DETAILED DESCRIPTION OF THE INVENTION

The transmission gear is generally designated by 10 and comprises a fixed gear case 12 through which a drive or input shaft 16 extends into the transmission gear 10. The shaft 16 is rotatably supported at 14 and comes from the main gear (not shown). In axial continuation of the drive shaft 16, a driven shaft 18 transmits the rotation, which is introduced by the drive shaft 16 into the transmission gear 10, to the further driveline of a vehicle which is not shown herein.

A planetary gear 20 is situated in the transmission gear 10 between the drive shaft 16 and the driven shaft 18. The planetary gear 20 comprises a sun wheel 22 which rests on the end section of the drive shaft 16 and is torsionally rigidly connected with the drive shaft 16 by a multi-groove profile, and a plurality of planet wheels 26, only one of which is shown in the FIGURE. The planet wheels 26 mate with the sun wheel 22 and are rotatably supported by a planet wheel carrier 28 which in turn is rotatably supported on a stub 30 of the driven shaft 18 located in the transmission gear 10.

A respective extension 32, 34 extends from either side of the planet wheel carrier 28 in the axial direction. Each extension 32 and 34 is provided at its free end with a circumferential outer toothing 36 and 38, respectively. An axially displaceable clutch element 40 is arranged coaxially to the planet wheel carrier 28. The element 40 comprises a first annular clutch wheel 42 which concentrically encompasses the axial extension 32 of the planet wheel carrier 28 and a second annular clutch wheel 44 which concentrically encompasses the axial extension 34 of the planet wheel carrier 28. In order to connect the two clutch wheels 42 and 44 torsionally and axially rigidly with one another, a spacer sleeve 48 extends through the shaft 46, which for this purpose is hollow here, of each planet wheel 26, and a bolt 50 extends through each sleeve 10, as is shown, to hold the two clutch wheels 42 and 44 together.

The first clutch wheel 42 is internally and externally toothed, so that it can cooperate both with the outer toothing 36 formed on the axial extension 32 as well as with toothing 52 formed on the inside of the gear case 12. The second clutch wheel 44 is only internally toothed and can cooperate both with the outer toothing 38 formed on the axial extension 34 as well as with toothing 54 formed in an axial continuation of the driven shaft 18 in the transmission gear 10.

An actuating member 56 projects from the outside radially into the gear case 12 and its radially inner end engages an annular groove 58 which is provided in the first clutch wheel 42. An actuating rod 60 is fixedly connected with the radial outer end of the actuating member 56, which rod extends radially outside of and past the transmission gear 10 in the axial direction. This actuating rod 60 can be used to axially push the clutch element 40 from its first position, as represented in the FIGURE where the first clutch wheel is in engagement with the toothings 36 and 52 and thus connects the planet wheel carrier 28 in a torsionally rigid manner with the gear case 12, to a second position (in the FIGURE to the right) where the second clutch wheel 44 connects the planet wheel carrier 28 in a torsionally rigid manner with the driven shaft 18 by engagement of the inner toothing of the clutch wheel 44 with the toothing 54 formed on the driven shaft 18. In the second position of the clutch element 40, the outer toothing of the first clutch wheel 42 is no longer in engagement with the toothing 52 on the gear case 12.

The transmission gear 10 is further provided with a gear rim 62 which encompasses the planet wheels 26 and whose inner toothing mates with the same. In continuation of its inner toothing, the gear rim 62 is provided with inner mating teeth 64 and 66 to cooperate with first toothing 68 arranged on the outside of the gear case 12 and with second toothing 70, respectively, which is axially spaced from the first toothing and is torsionally rigidly connected with the driven shaft 18. For this purpose, the gear rim 62 is arranged axially displaceable, so that, as is shown, either its mating teeth 66 can cooperate with the second toothing 70 or its mating teeth 64 can cooperate with the toothing 68 on the gear case 12. The position of the gear rim 62 as is shown in the FIGURE, in which it is coupled by its mating teeth 66 and the second toothing 70 with the driven shaft 18 in a torsionally rigid manner, corresponds to the high transmission (rapid drive) of the transmission gear 10. If the gear rim 62 is coupled by its mating teeth 64 and the first toothing 68 with the gear case 12 in a torsionally rigid manner, then the lower transmission (e.g. for mountain driving) of the transmission gear is activated. As is shown, the gear rim 62 can be displaced axially by an actuating rod 72 whose bent end 74 engages in an annular groove formed in the outside of the gear rim 62.

In order to ensure an easy and low-noise mating, which is as free from wear and tear as is possible, of the mating wheels 64 and 66 with the first toothing 68 and the second toothing 70, respectively, a first synchronizing ring 76 is arranged between the gear rim 62 and the first toothing 68, and a second synchronizing ring 78 is arranged between the gear rim 62 and the second toothing 70. The function of these synchronizing rings 76 and 78 is known and therefore need not be explained in more detail.

In the first position of the clutch element 40, the driven shaft 18 rotates oppositely to the drive or input shaft 16. If the clutch element 40 is located in its second position, the drive shaft 16 and the driven shaft 18 rotate in the same direction. A mechanical lock (not shown) prevents the lower transmission of the transmission gear 10 from being activated together with its reverse run, which means that the clutch element 40 is situated in its first position and at the same time the gear rim 62 is torsionally rigidly connected with the gear case 12 by way of its mating teeth 64 and the first toothing 68. During the standstill of the transmission gear 10, the mechanical lock can be deactivated in order to allow a concurrent engagement of the reverse run and low transmission in order to secure a vehicle against rolling away.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A transmission gear for a motor vehicle comprising:
   a gear case;
   a rotatable drive shaft rotatably supported at the gear case,
      a driven shaft rotatably separated from the drive shaft and also rotatably supported at the gear case;
   a planetary gear for providing drive connection between the drive shaft and the driven shaft, the planetary gear comprising:
      a sun wheel non-rotatably connected with the drive shaft;
      a planet wheel carrier around the sun wheel and rotatable with respect to the sun wheel;
      at least one planet wheel supported on the planet wheel carrier around the sun wheel, each planet wheel mating with the sun wheel for being rotated with respect to the planet wheel carrier by rotation of the sun wheel;
      a gear rim rotatable with respect to and mating with the at least one planet wheel;
   a clutch element axially displaceable along the drive shaft between a first position at which the clutch element couples the planet wheel carrier with the gear case in a torsionally rigid manner and a second position at which the clutch element couples the planet wheel carrier with the driven shaft in a torsionally rigid manner; the clutch element comprises first and second axially spaced, annular clutch wheels and a connection between the spaced clutch wheels, the clutch wheels encompassing the planet wheel carrier.

2. The transmission gear of claim 1, wherein the gear case is fixed against rotation and the drive shaft, the driven shaft, the planet wheel carrier and the gear rim are rotatable with respect to the gear case.

3. The transmission gear of claim 1, wherein the planet wheel carrier has spaced first and second axially extending extensions, and each of the first and second clutch wheels encompasses a respective one of the first and second axial extensions of the planet wheel carrier.

4. The transmission gear of claim 1, wherein the first clutch wheel is axially further from the driven shaft and the second clutch wheel is axially closer to the driven shaft; and
   wherein in the second position of the clutch element, the second clutch wheel is coupled with the driven shaft and with the planet wheel carrier in a torsionally rigid manner for torsionally rigidly coupling the planet wheel carrier with the driven shaft.

5. The transmission gear of claim 1, wherein the connection of the first and second clutch wheels is tortionally rigid and comprises elements which extend through at least one of the planet wheels on the axis thereof.

6. The transmission gear of claim 1, further comprising the gear rim being axially movable between a respective third position and a respective fourth position with respect to the gear case, the gear rim mating with the planet wheels; in its third position, the gear rim being torsionally rigidly connected with the gear case, and in its fourth position, the gear rim being torsionally, rigidly connected with the driven shaft.

7. The transmission gear of claim 1, wherein there are a plurality of the planet wheels supported on the planet wheel carrier.

8. The transmission gear of claim 7, wherein the gear rim encompasses the planet wheels.

9. The transmission gear of claim 1, wherein the first clutch wheel is axially further from the driven shaft and the second clutch wheel is axially closer to the driven shaft;
   with the clutch element in its first position, the first clutch wheel is internally coupled with the planet wheel carrier and is externally coupled with the gear case for coupling the planet wheel carrier in a torsionally rigid manner with the gear case.

10. The transmission gear of claim 9, wherein in the second position of the clutch element, the second clutch wheel is coupled with the driven shaft and with the planet wheel carrier in a torsionally rigid manner for torsionally rigidly coupling the planet wheel carrier with the driven shaft.

11. The transmission gear of claim 10, wherein the first clutch wheel is internally toothed, the planet wheel carrier is externally toothed to mate with the internal toothing of the first clutch wheel for internally coupling the first clutch wheel with the planet wheel carrier;
   the first clutch wheel is externally toothed and the gear case is internally toothed to mate with the external toothing of the first clutch wheel for externally coupling the first clutch wheel with the gear case;
   the second clutch wheel is also internally toothed to mate with another external toothing of the planet wheel carrier, and the driven shaft is externally toothed also to mate with the second clutch wheel when the clutch element is in the second position thereof for coupling the second clutch wheel with the planet wheel carrier and the driven shaft.

12. The transmission gear of claim 10, wherein in the first position of the clutch element, the first clutch wheel is in engagement with the planet wheel carrier and with the gear case while the second clutch wheel is out of engagement with the driven shaft; and in the second position of the clutch element, the second clutch wheel is in engagement with the planet wheel carrier and the driven shaft while the first clutch wheel does not engage the planet wheel carrier with the gear case.

13. The transmission gear of claim 9, further comprising an actuating member which projects from outside into the gear case and is in engagement with the clutch element, and the actuating member is movable for moving the clutch element between its first and second positions.

14. The transmission gear of claim 13, wherein the actuating member projects radially into the gear case and has a radially inner end which projects radially into the first clutch wheel.

15. The transmission gear of claim 14, further comprising an actuating rod which extends parallel to the drive shaft, is located radially outside the gear rim and is connected with the actuating member for moving the actuating member.

16. A transmission gear for a motor vehicle comprising:

a gear case;

a rotatable drive shaft rotatably supported at the gear case, a driven shaft rotatably separated from the drive shaft and also rotatably supported at the gear case;

a planetary gear for providing drive connection between the drive shaft and the driven shaft, the planetary gear comprising:

a sun wheel non-rotatably connected with the drive shaft;

a planet wheel carrier around the sun wheel and rotatable with respect to the sun wheel;

at least one planet wheel supported on the planet wheel carrier around the sun wheel, each planet wheel mating with the sun wheel for being rotated with respect to the planet wheel carrier by rotation of the sun wheel;

a gear rim rotatable with respect to and mating with the at least one planet wheel;

a clutch element axially displaceable along the drive shaft between a first position at which the clutch element couples the planet wheel carrier with the gear case in a torsionally rigid manner and a second position at which the clutch element couples the planet wheel carrier with the driven shaft in a torsionally rigid manner;

the gear rim being axially movable between a respective third position and a respective fourth position with respect to the gear case, the gear rim mating with the planet wheels; in its third position, the gear rim being torsionally rigidly connected with the gear case, and in its fourth position the gear rim being torsionally, rigidly connected with the driven shaft;

first toothing rigidly connected on the gear case and second toothing axially spaced from the first toothing and torsionally rigidly connected with the driven shaft, the gear rim being disposed between the first and second toothings;

the gear rim having third toothing thereon engageable with the first toothing upon movement of the gear rim to the third position thereof; and the gear rim having fourth toothing thereon engageable with the second toothing upon movement of the gear rim to the fourth position thereof.

17. The transmission gear of claim 16, further comprising a first synchronizing ring between the gear rim and the first toothing and a second synchronizing ring between the gear rim and the second toothing.

* * * * *